(12) United States Patent
Grajcar

(10) Patent No.: US 10,330,305 B2
(45) Date of Patent: Jun. 25, 2019

(54) INTEGRAL CONDUIT MODULAR LIGHTING

(71) Applicant: Once Innovations, Inc., Plymouth, MN (US)

(72) Inventor: Zdenko Grajcar, Crystal, MN (US)

(73) Assignee: Once Innovations, Inc., Plymouth, MN (US)

( * ) Notice: Subject to any disclaimer, the term of this patent is extended or adjusted under 35 U.S.C. 154(b) by 1283 days.

(21) Appl. No.: 13/951,845

(22) Filed: Jul. 26, 2013

(65) Prior Publication Data

US 2013/0308313 A1 Nov. 21, 2013

Related U.S. Application Data

(63) Continuation-in-part of application No. 13/077,955, filed on Mar. 31, 2011, now Pat. No. 8,651,691.
(Continued)

(51) Int. Cl.
*F21S 8/00* (2006.01)
*F21V 31/00* (2006.01)
(Continued)

(52) U.S. Cl.
CPC .............. *F21V 31/005* (2013.01); *A01K 1/00* (2013.01); *A01K 31/00* (2013.01); *A01K 31/18* (2013.01); *F21S 2/005* (2013.01); *F21W 2131/40* (2013.01); *F21Y 2113/13* (2016.08); *F21Y 2113/20* (2016.08); *F21Y 2115/10* (2016.08); *H05B 33/0818* (2013.01); *Y10T 29/49117* (2015.01)

(58) Field of Classification Search
CPC ................................ B60Q 1/26; F21V 31/005

USPC ...... 362/227, 235, 249.01, 249.02, 362, 551, 362/555, 560, 800; 257/74, 98-100
See application file for complete search history.

(56) References Cited

U.S. PATENT DOCUMENTS

2005/0077525 A1  4/2005 Lynch et al.
2006/0262542 A1* 11/2006 Ibbitson ................ F21S 8/022
                                                         362/368
(Continued)

FOREIGN PATENT DOCUMENTS

EP           2383508 A1    11/2011
KR     1020100108797 A    10/2010
(Continued)

OTHER PUBLICATIONS

"U.S. Appl. No. 13/077,955, Notice of Allowance dated Oct. 15, 2013", 9 pgs.
(Continued)

*Primary Examiner* — Andrew J Coughlin
(74) *Attorney, Agent, or Firm* — Schwegman, Lundberg & Woessner, P.A.

(57) ABSTRACT

An integral conduit modular lighting system that has a light board having circuitry that is secured to a heat sink with an adhesive layer. The heat sink has a gasket in order to securely connect the lighting system to a preexisting conduit body such that the lighting system withstand a high pressure wash without leakage to the board. The heat sink also has opening that mate with openings of preexisting electrical conduit bodies to provide installation of the modular lighting system to existing electrical conduit bodies.

11 Claims, 7 Drawing Sheets

Related U.S. Application Data

(60) Provisional application No. 61/675,859, filed on Jul. 26, 2012, provisional application No. 61/319,726, filed on Mar. 31, 2010.

(51) Int. Cl.
| | | |
|---|---|---|
| *A01K 1/00* | (2006.01) | |
| *A01K 31/00* | (2006.01) | |
| *F21S 2/00* | (2016.01) | |
| *A01K 31/18* | (2006.01) | |
| *F21W 131/40* | (2006.01) | |
| *H05B 33/08* | (2006.01) | |
| *F21Y 115/10* | (2016.01) | |
| *F21Y 113/13* | (2016.01) | |
| *F21Y 113/20* | (2016.01) | |

(56) References Cited

U.S. PATENT DOCUMENTS

| | | |
|---|---|---|
| 2007/0041220 A1 | 2/2007 | Lynch |
| 2010/0061108 A1 | 3/2010 | Zhang et al. |
| 2011/0204780 A1* | 8/2011 | Shum et al. .................. 315/35 |
| 2011/0228529 A1* | 9/2011 | Patel ........................ F21V 3/02 362/235 |
| 2011/0241559 A1 | 10/2011 | Grajcar |
| 2012/0008331 A1 | 1/2012 | Marquardt et al. |

FOREIGN PATENT DOCUMENTS

| | | |
|---|---|---|
| KR | 1020120031277 A | 4/2012 |
| WO | WO-2009077177 A1 | 6/2009 |
| WO | WO-2014018846 A2 | 1/2014 |
| WO | WO-2014018846 A3 | 1/2014 |

OTHER PUBLICATIONS

"U.S. Appl. No. 13/077,955, Office Action dated Apr. 2, 2013", 10 pgs.

"U.S. Appl. No. 13/077,955, Response filed Jun. 28, 2013 Office Action dated Apr. 2, 2013", 8 pgs.

"International Application Serial No. PCT/US2011/030843 International Preliminary Report on Patentability dated Oct. 2, 2012", 6 pgs.

"International Application Serial No. PCT/US2013/052235, International Preliminary Report on Patentability dated Feb. 5, 2015", 7 pgs.

"International Application Serial No. PCT/US2013/052235, International Search Report dated Nov. 19, 2013", 3 pgs.

"International Application Serial No. PCT/US2013/052235, Written Opinion dated Nov. 19, 2013", 5 pgs.

"European Application Serial No. 20130823052.9, Extended European Search Report filed Feb. 1, 2016", 8 pgs.

* cited by examiner

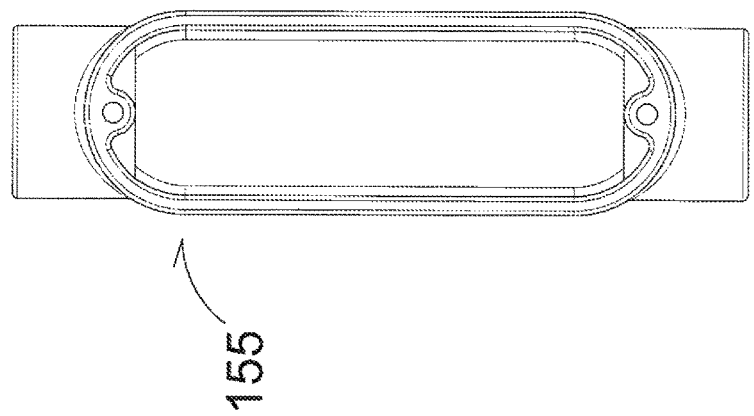
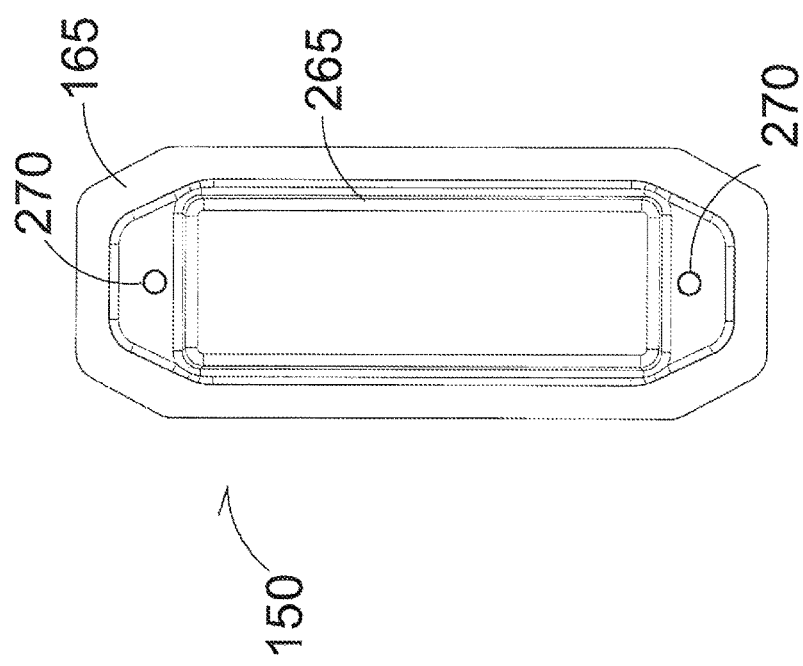

INTEGRAL CONDUIT MODULAR LIGHTING

CROSS REFERENCE TO RELATED APPLICATION(S)

This application claims benefit to and is based upon U.S. Provisional Patent Application Ser. No. 61/675,859 filed. Jul. 26, 2012 titled "Integral Conduit Modular Lighting," and that application is incorporated by reference in full, and this application is also a continuation-in-part of and claims benefit of U.S. application Ser. No. 13/077,955, titled "Integral Conduit Modular Lighting," filed Mar. 31, 2011, now U.S. Pat. No. 8,651,691, issued Feb. 18, 2014, also that claimed benefit of U.S. Provisional Patent Application Ser. No. 61/319,726, filed Mar. 31, 2010 of which all are incorporated by reference in full herein.

BACKGROUND

This invention relates to lighting assemblies. More specifically this invention relates to methods and apparatus involving lighting integrated with a conduit.

Lighting can be an important consideration in some applications. In commercial or residential lighting, for example, various types of lighting systems have been commonly used for general illumination. For example, common lighting systems that have been used include incandescent or fluorescent lamps.

More recently, LEDs (light emitting diodes) are becoming widely used devices capable of illumination when supplied with current. Typically, an LED is formed as a semiconductor diode having an anode and a cathode. In theory, an ideal diode will only conduct current m one direction. When sufficient forward bias voltage is applied between the anode and cathode, conventional current flows through the diode. Forward current flow through an LED may cause photons to recombine with holes to release energy in the form of light.

The emitted light from some LEDs is in the visible wavelength spectrum. By proper selection of semiconductor materials, individual LEDs can be constructed to emit certain colors (e.g., wavelength), such as red, blue, or green, for example. In general, an LED may be created on a conventional semiconductor die. An individual LED may be integrated with other circuitry on the same die, or packaged as a discrete single component. Typically, the package that contains the LED semiconductor element will include a transparent window to permit the light to escape from the package.

As the cost of manufacturing LED lighting assemblies continues to decrease, real world applications increase. For example, LED lighting assemblies are beginning to be used in barn settings were preexisting electrical conduits exist to provide lighting from more traditional lighting assemblies. There is a need for LED lighting assemblies that will attach and connect to preexisting electrical conduits such that the lighting assemblies may easily replace existing lighting. Further a need exists for such lighting assemblies to be water tight for high pressure cleaning operations that occur in such facilities.

Therefore a principle object of the present invention is to provide an integral conduit modular lighting assembly that is interchangeable with preexisting electrical conduit;

Another object of the present invention is to reduce manufacturing costs associated with making an integral conduit modular lighting assembly.

BRIEF SUMMARY OF THE INVENTION

An integral conduit modular lighting system that has a light board having circuitry that is secured to a heat sink with an adhesive layer. The heat sink not only provides heat conveying advantages, but also provides surfaces for the adhesive layer and a gasket in order to securely connect the lighting system to a preexisting conduit body such that the lighting system will withstand a high pressure wash without leakage to the board. Further the lighting system is adapted to attach to preexisting electrical conduit bodies to provide easy and inexpensive installation of the modular lighting system.

BRIEF DESCRIPTION OF THE DRAWINGS

FIG. 5A is a front plan view of an integral conduit modular lighting system;

FIG. 5B is a front plan view of a conduit body and integral conduit modular lighting system;

DETAILED DESCRIPTION OF A PREFERRED EMBODIMENT OF THE INVENTION

Figure 1:
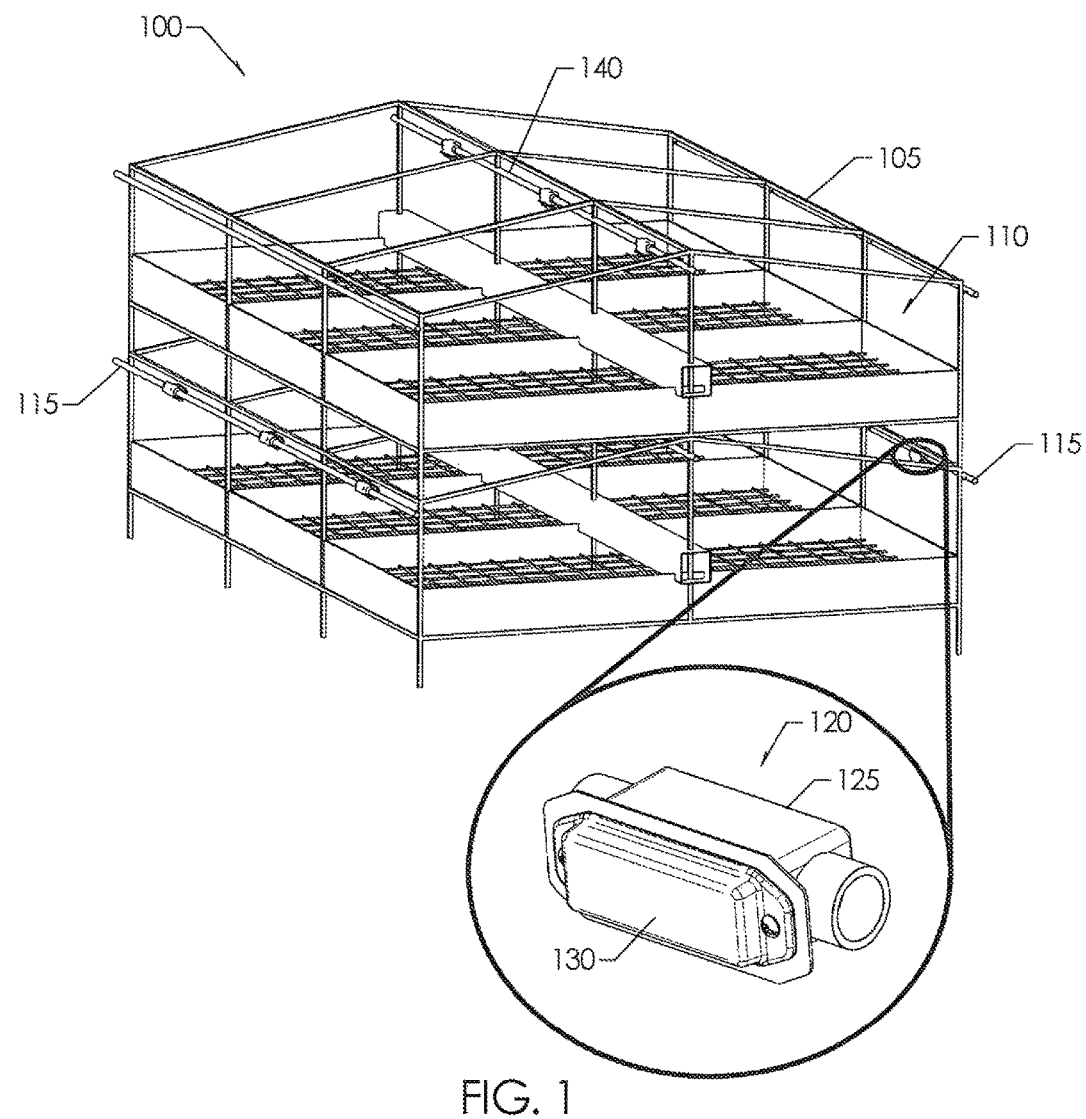
FIG. 1 is a perspective view of an illustrative free range-style chicken coop installation with an exemplary embodiment of an integral conduit modular (ICM) lighting system.

FIG. 1 shows a perspective view of an illustrative free range-style chicken coop installation with an exemplary embodiment of an integral conduit modular 20 (ICM) lighting system. In this example, a coop installation 100 includes a frame 105 and a number of bays disposed on rows of three bays on both a lower level and an upper level. In an illustrative example of egg production, a number of chickens may spend at least part of their time in the bays where they may receive food, air, water, and they may also deposit eggs. In some coop installations, the eggs may roll 25 down a ramp (not shown) to an egg collection/conveyer system (not shown).

On the lower level of the coop installation 100, an interior volume of each of the bays 110 is illuminated by an integral conduit modular lighting system that includes sections of electrical conduit 115 connected to corresponding ports of a number of integral light modules (ILMs) 120. Each of the ILMs 120 includes a conduit body 125 and a light engine 130 attached to an open longitudinal face of the conduit body 125. For the depicted lower level of bays 110, the conduit 115 and ILMs 120 are positioned to direct from a peripheral position outside the frame 105 and toward a central midline of the coop installation 100. The ILMs 120 are positioned substantially in an upper portion of the bays 110 of the lower level to promote sufficient illumination of the water and feed facilities within each of the bays 105. The ILM 120 may advantageously provide substantial illumination of food and water access facilities in the bays 110 while the bays are substantially populated with chickens.

By way of example, and not limitation, and in various implementations, the conduit 115 and/or the conduit body 125 may be of a standard or conventional type which may be used by electricians, for example, to install electrical wiring. In the depicted example, the conduit body 125 may be of the typei of conduit body for rigid conduit that is commercially available in standard sizes, for example, from Thomas & Betts Corporation of Tennessee.

On the upper level of the coop installation 100, an interior volume of each of the bays 110 is illuminated by an integral conduit modular lighting system that includes sections of electrical conduit 140 connected to corresponding ports of a number of integral light modules (ILMs) 150. Each of the ILMs 150 includes a conduit body 155 and oppositely directed light engines 160a, 160b attached to opposing open longitudinal faces of the conduit body 155. For the depicted upper level of bays 110, the conduit 140 and the ILMs 150 are positioned to direct light outward from a central position along the midline of the coop installation 100. Each of the ILMs 150 in the upper level are positioned substantially in an upper portion of the bays 110 to provide sufficient illumination of the water and feed facilities within the bays 110 on either side of the midline of the coop installation 100. The ILM 150 may advantageously provide substantial illumination of food and water access facilities in the bays 110 while the bays are substantially populated with chickens.

Figure 2:
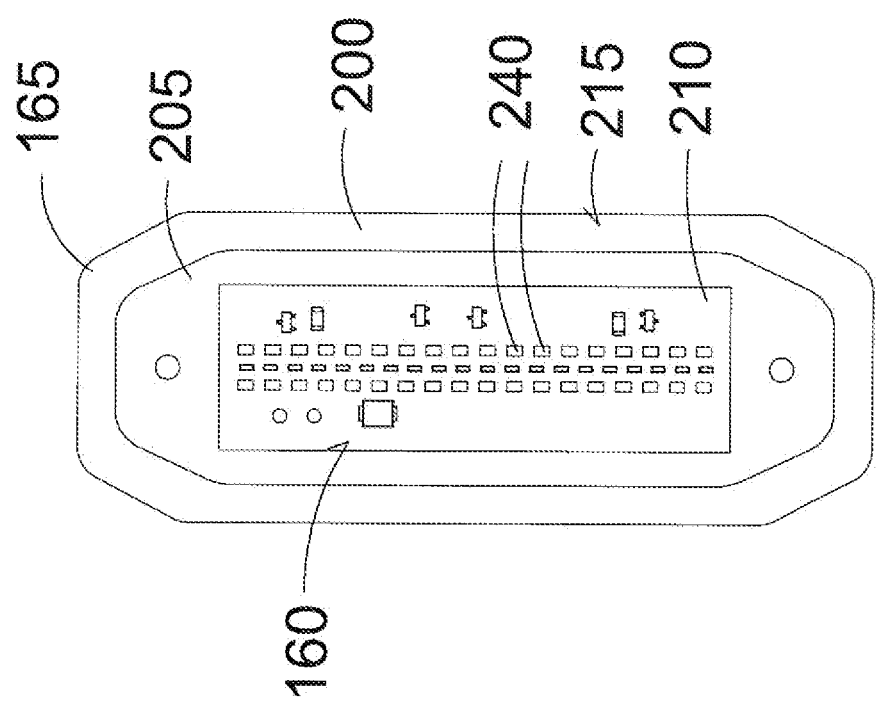
FIG. 2 is a front perspective view of an integral conduit modular lighting system with the lens removed.
Figure 3:
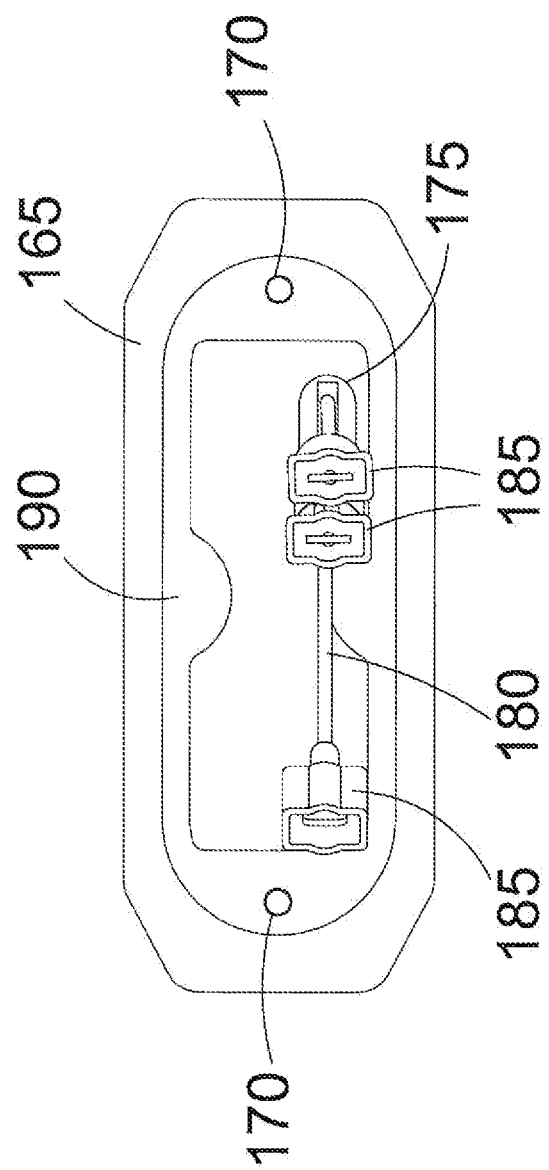
FIG. 3 is a back perspective view of an integral conduit modular lighting system.

In one embodiment as best shown in FIG. 2 the ILM 150 includes a light engine 160 that has a heat sink 165 that in one embodiment is a sheet of metal where first openings 170 are disposed through the heat sink 165 to align with openings on the conduit body 155. A second opening 175 is also disposed through the heat sink 165 to provide a pathway for wire connectors 180 that can include leads 185 for electrical connection to wiring within the conduit 140 to power the ILM 150.

A gasket 190 is secured to a first side 195 of the heat sink 165 and is of size and shape to mate with the perimeter of the conduit body 155. In this manner a sealing connection is formed between the ILM 150 and conduit body 155 when fasteners are used to secure the ILM 150 to the conduit. Specifically the gasket 190 is made of a flexible material that deforms when pressed against the conduit body 155 to form a water tight seal between the heat sink 165 and conduit body 155.

On a second side 200 of the heat sink 165 an adhesive layer 205 is provided that in a preferred embodiment is a heat conducting epoxy that not only adheres or secures a light board 210 to the heat sink 165, but also conveys heat from the light board 210 to the heat sink 165. The adhesive layer 205 can be any size and can be of size and shape to have openings disposed therethrough to accommodate fasteners used to connect the ILM 150 to the conduit body 155.

Figure 4:
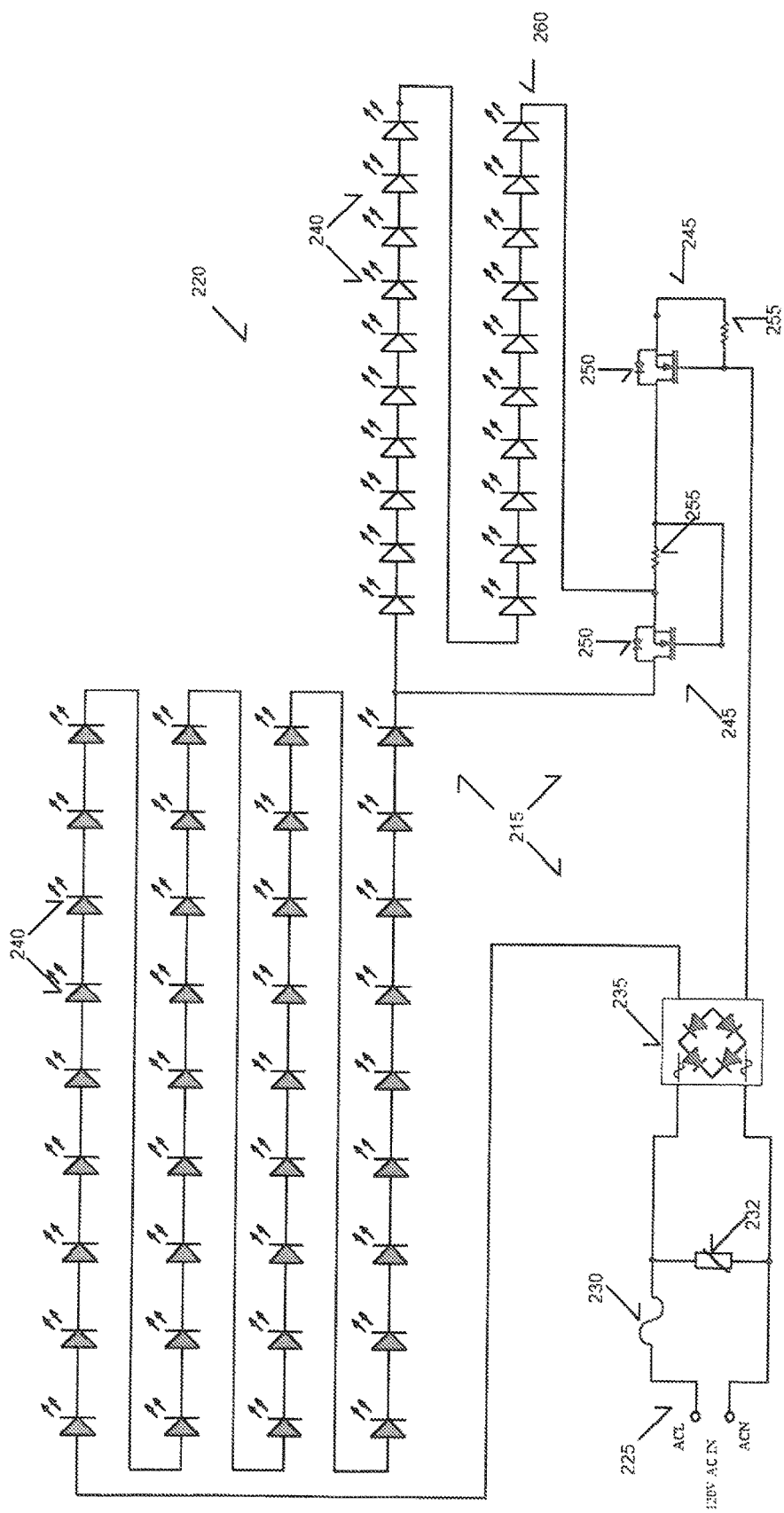
FIG. 4 is a schematic circuit diagram of an integral conduit modular lighting system.
Figure 6:
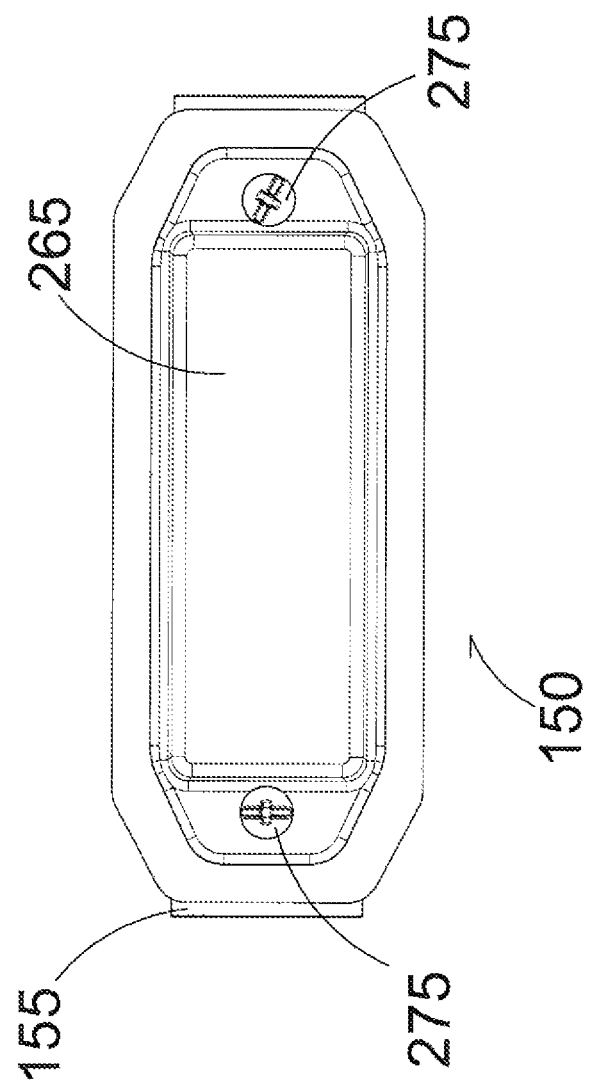
FIG. 6 is a front plan view of an integral conduit modular lighting system secured to a conduit body.
Figure 7:
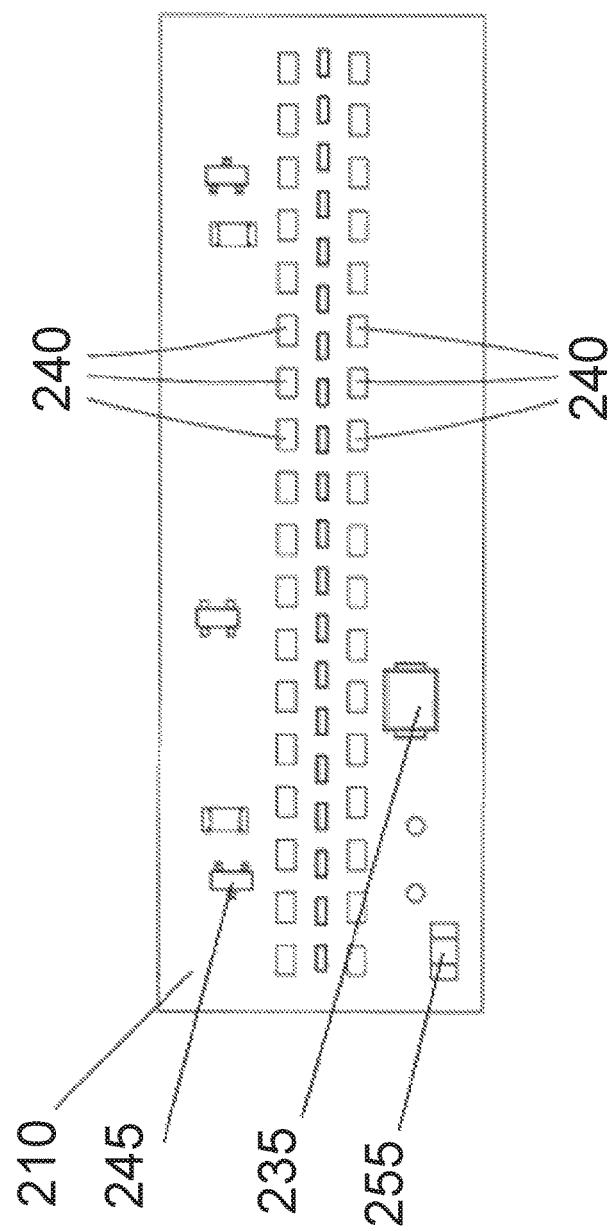
FIG. 7 is a front plan view of a substrate having electrical components thereon.

The light board 210 is a substrate that can be made out of any material including ceramic material or can also be a PCB, present a semiconductor die or the like such that the substrate can hold and electrically connect a plurality of electrical components 215. These electrical components 215 are best shown in the circuit diagram of FIG. 4.

In particular the circuit 220 on the board 210 receives power from an AC input 225. A fuse 230 is provided for circuit protection along with a metal-oxide varistor (MOV) 232 or zener diode before the AC current flows to a rectifier 235. Once rectified that current flow to a plurality of LEDs 240 and driving elements 245 such as transistors 250 used in combination with resistors 255 to form a bypass circuit 260 to control the operation of the LEDs 240. In one embodiment the transistors are MOSFETs, while in other embodiments the transistors are IGFETs or other similar transistors known in the art. In this embodiment the electrical components 215 are arranged as shown in FIG. 2 with the plurality of LEDs 240 centrally located on the board 210 with other electrical components 215 such as the rectifier 235 and driving elements 245 on the perimeter of the board 210 surrounding the LEDs to provided enhanced lighting diffusion.

A lens element 265 is secured to the adhesive layer 205 and surrounds the board 210. In this manner the lens 265 provides additional water tight protection to the board 210 to ensure the circuitry 220 on the board does not get wet during high pressure cleaning of the lighting as is common in an agricultural or barn setting. In addition the lens 265 is made of a transparent material to allow the light from the LEDs to be diffused throughout the dwelling or area containing the lighting assembly. In one embodiment the lens 265 is made of a plastic material. The lens 265 also has openings 270 disposed therethrough that align with the openings in the adhesive layer 205, heat sink 165 and conduit body 155 so that fasteners 275 can be used to secure the ILM 150 to the conduit body 155.

Thus provided is a ILM 150 that is easy and inexpensive to manufacture. The ILM can be used to replace existing lighting in dwellings such as barns or other agricultural dwellings by using existing electrical conduits 115. Specifically, the ILM 150 has wire connectors 180 that connect to the existing conduit wiring and a structure designed to sealing secure to an existing conduit body 155. In particular, as a result of the use of a gasket 190, adhesive layer 205 and lens 265 the board 210 is sealed from exterior conditions preventing shortages when the ILMs 150 are washed with high pressure water. Thus, at the very least all of the objects have be met.

What is claimed is:

1. A device for illumination, comprising:
    a conduit body;
    a light board including electrical circuitry on a substrate with a first side and a second side defining opposing planar surfaces;
    a light engine module comprising an array of light sources arranged on the first side of the substrate with driving circuitry that supplies electrical excitation to the array of light sources;
    said second side engaging an adhesive layer to secure the light engine module to a heat sink;
    said heat sink mounted on the conduit body;
    a lens module having an interior lens surface engaged and secured to the adhesive layer to provide a water tight seal to prevent the entry of water onto the electrical circuitry; and
    a gasket secured to the heat sink.

2. The device of claim 1 further comprising at least one mounting hole for securely mounting the light engine module in a fixed position relative to the conduit body.

3. The device of claim 1, wherein the conduit body comprises an industry standard electrical junction box.

4. The device of claim 1 wherein when the light engine module is securely mounted to the conduit body the gasket engages the conduit body to prevent water from entering the conduit body.

5. The device of claim 1, wherein the electrical excitation signals comprise an alternating current (AC) signal.

6. The device of claim 1 wherein the array of light sources are light emitting diodes.

7. The device of claim 1 wherein the substrate is a printed circuit board.

8. A method of installing a device for illumination in a chicken coop installation to prevent the flow of water within the device, steps comprising:
- providing an electrical conduit connected to corresponding ports of an integral light module having a conduit body;
- said integral light engine module further comprising an array of light sources arranged on a substrate having a first side and a second side defining opposing planar surfaces;
- adhering the substrate to a heat sink with an adhesive layer;
- securing a lens to the heat sink against the adhesive layer to seal the substrate from water; and
- mounting the heat sink to the conduit body to prevent water from entering the conduit body; and
- securing a gasket to a side of the heat sink opposite the substrate.

9. The method of claim 8 further comprising the step of pressing the gasket against the conduit body to provide a water tight seal.

10. The method of claim 9 wherein the gasket is made of a flexible material that deforms when the gasket is pressed against the conduit body.

11. The method of claim 9 wherein the array of light sources are light emitting diodes.

* * * * *